(12) United States Patent
Simonyants et al.

(10) Patent No.: US 12,127,574 B2
(45) Date of Patent: Oct. 29, 2024

(54) METHOD FOR PREPARING SEMI-FINISHED PRODUCTS IN A PACKAGE WITH THE POSSIBILITY OF THEIR FURTHER AUTOMATED HEATING AND/OR COOKING

(71) Applicant: QUMMY INC., San Francisco, CA (US)

(72) Inventors: Artem G. Simonyants, Krasnodar (RU); Evgeniy V. Pisarev, Krasnodar (RU); Aleksey A. Kislun, Krasnodar (RU); Artem V. Komissarov, Krasnodar (RU); Danil A. Filatov, Krasnodar (RU); Rinat R. Salikhov, Krasnodar (RU); Sergey A. Rodionov, Krasnodar (RU)

(73) Assignee: QUMMY, INC., San Francisco, CA (US)

( * ) Notice: Subject to any disclaimer, the term of this patent is extended or adjusted under 35 U.S.C. 154(b) by 0 days.

(21) Appl. No.: 17/961,237

(22) Filed: Oct. 6, 2022

(65) Prior Publication Data
US 2023/0217968 A1  Jul. 13, 2023

(30) Foreign Application Priority Data
Jan. 13, 2022  (RU) .......................... RU2021129950

(51) Int. Cl.
*A23L 3/36* (2006.01)
*A23L 3/28* (2006.01)
(Continued)

(52) U.S. Cl.
CPC ................. *A23L 3/364* (2013.01); *A23L 3/28* (2013.01); *A23L 5/15* (2016.08); *B65B 25/001* (2013.01);
(Continued)

(58) Field of Classification Search
CPC ... A23L 3/364; A23L 3/28; A23L 5/15; A23L 3/3418; A23L 3/3445; A23L 3/36;
(Continued)

(56) References Cited

U.S. PATENT DOCUMENTS 3,966,980 A * 6/1976 McGuckian ........... A23B 4/068
                                                       426/418
6,165,526 A * 12/2000 Newman .................... A23L 3/01
                                                       426/248
(Continued)

FOREIGN PATENT DOCUMENTS

CN      106721870 B * 6/2020 ............... A23L 3/01
EP        3037003 A1 * 6/2016 ............... A23B 4/09
(Continued)

OTHER PUBLICATIONS

Safe Temperatures for Food Storage: A Free Guide to Cooling and Chilling Times, pp. 6-7, Addie Lewis, 2021 (Year: 2021).*

*Primary Examiner* — Drew E Becker
*Assistant Examiner* — Luis Eugenio Diou Berdecia
(74) *Attorney, Agent, or Firm* — Fitch Even Tabin & Flannery, LLP

(57) ABSTRACT

A method for preparing semi-finished products in a package with the possibility of their further automated heating and/or cooking, according to which the components of semi-finished products are preliminarily prepared, they are accelerated cooling and placed in a portioned container. Sealing a container with a semi-finished product, treating it with ultraviolet radiation and applying a barcode to the container with a program for warming up and/or cooking in a microwave oven, which contains an indication of the power level of the microwave source, which is sufficient for uniform and complete heating and/or cooking of all components that make up the semi-finished product, as well as time. Shock freezing of a semi-finished product is carried out and its (Continued)

storage and/or transportation is carried out. Before eating a semi finished product, it is heated and/or cooked in a microwave oven equipped with a barcode reader.

6 Claims, 1 Drawing Sheet

(51) Int. Cl.
    *A23L 5/10*           (2016.01)
    *B65B 25/00*         (2006.01)
    *B65B 25/22*         (2006.01)
    *B65B 31/02*         (2006.01)
    *B65B 55/02*         (2006.01)
    *B65B 61/02*         (2006.01)

(52) U.S. Cl.
    CPC ............ *B65B 25/22* (2013.01); *B65B 31/025* (2013.01); *B65B 55/02* (2013.01); *B65B 61/025* (2013.01); *A23V 2002/00* (2013.01)

(58) Field of Classification Search
    CPC ......... A23L 3/365; A23L 5/00; B65B 25/001; B65B 25/22; B65B 31/025; B65B 55/02; B65B 61/025; B65B 29/08; B65B 31/00; B65B 61/26; B65B 2220/24; A23V 2002/00; A23B 4/06
    USPC ........ 426/234, 231, 113–114, 131, 243, 497, 426/523, 524; 62/65
    See application file for complete search history.

(56) References Cited

U.S. PATENT DOCUMENTS

| | | | | |
|---|---|---|---|---|
| 2002/0192342 A1* | 12/2002 | Horn | ............... | A23L 3/36 426/524 |
| 2003/0185944 A1* | 10/2003 | Zelski | ............... | A23L 35/00 426/120 |
| 2003/0198716 A1* | 10/2003 | Hankinson | ............ | A23B 7/144 426/248 |
| 2005/0003057 A1* | 1/2005 | Takahashi | ............. | A23B 7/16 426/393 |
| 2006/0198931 A1* | 9/2006 | Neto | ............. | A23L 7/11 426/106 |
| 2007/0172560 A1* | 7/2007 | Mirtsching | ............. | A23L 3/28 426/325 |
| 2011/0005249 A1* | 1/2011 | Kim | ............. | F25D 29/00 62/208 |
| 2011/0154836 A1* | 6/2011 | Ben-Shmuel | ............. | H05B 6/688 219/679 |
| 2011/0300260 A1* | 12/2011 | Cao | ............. | A23L 5/15 426/281 |
| 2013/0291570 A1* | 11/2013 | Dahokey | ............. | F25D 25/00 62/63 |
| 2015/0118368 A1* | 4/2015 | Lin | ............. | H05B 6/6438 426/231 |
| 2016/0050945 A1* | 2/2016 | Sun | ............. | A23L 17/00 426/238 |
| 2016/0058230 A1* | 3/2016 | Choueiri | ............. | B65D 77/003 426/232 |
| 2016/0122118 A1* | 5/2016 | Smith | ............. | A23L 3/364 426/107 |
| 2016/0183543 A1* | 6/2016 | Kortschack | ............. | A23B 4/015 426/234 |
| 2017/0016623 A1* | 1/2017 | Rabie | ............. | F24C 7/088 |
| 2017/0135383 A1* | 5/2017 | Liss | ............. | A47J 27/002 |
| 2020/0170083 A1* | 5/2020 | Zickel | ............. | H05B 6/6447 |
| 2020/0245652 A1* | 8/2020 | Haugland | ............. | A23B 4/07 |
| 2021/0022355 A1* | 1/2021 | Ashie | ............. | A23L 3/365 |
| 2021/0122509 A1* | 4/2021 | Wiese | ............. | A23L 15/00 |

FOREIGN PATENT DOCUMENTS

| | | | |
|---|---|---|---|
| KR | 20210141926 A | * 11/2021 | |
| RU | 2755155 C2 | * 9/2021 | ............... A23L 5/13 |
| WO | WO-9300825 A2 | * 1/1993 | ............... A23L 2/42 |

* cited by examiner

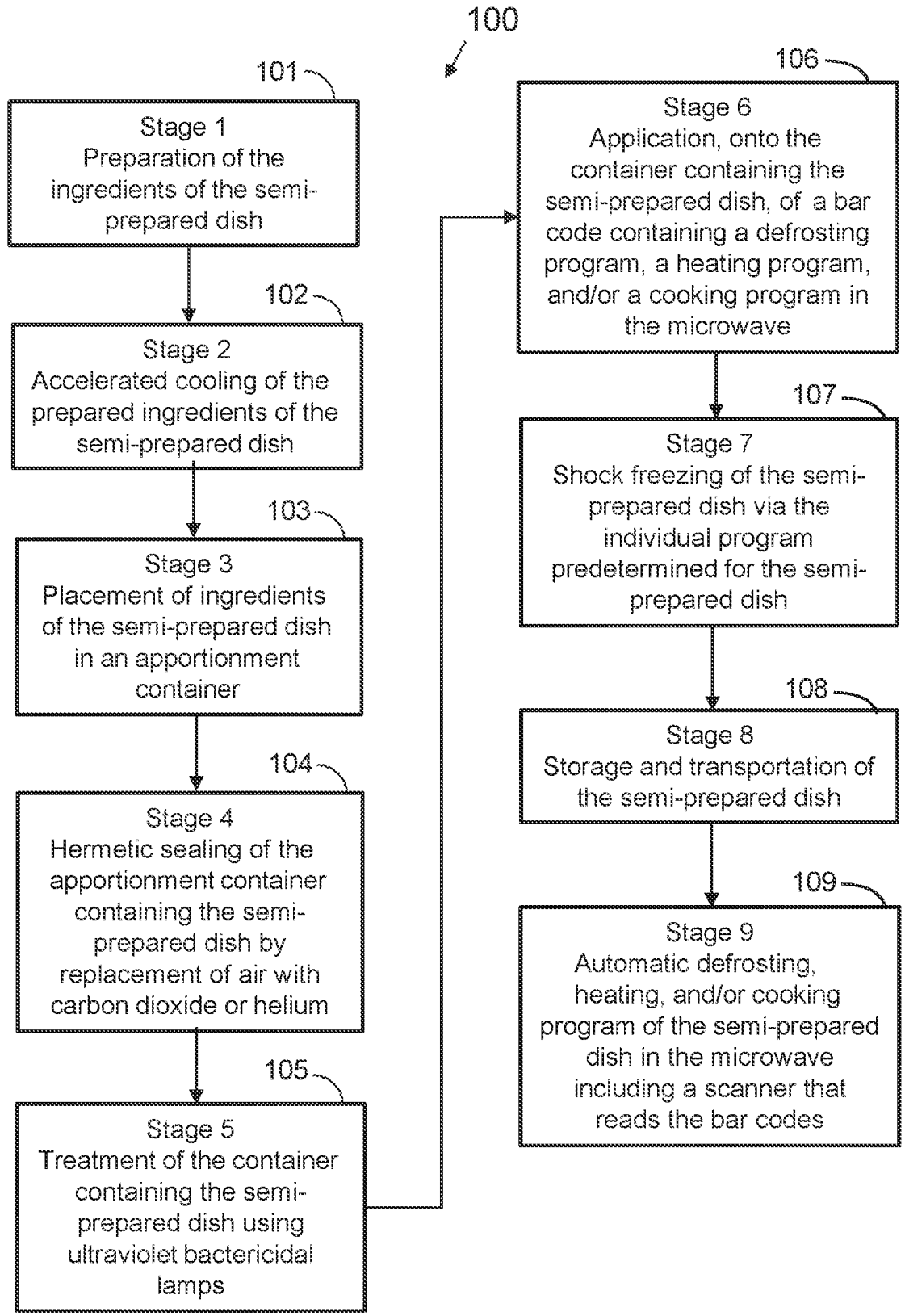

METHOD FOR PREPARING SEMI-FINISHED
PRODUCTS IN A PACKAGE WITH THE
POSSIBILITY OF THEIR FURTHER
AUTOMATED HEATING AND/OR COOKING

CROSS-REFERENCE TO RELATED
APPLICATIONS

This Application Claims priority to Russian patent application no. 2021129950, filed Jan. 13, 2022.

TECHNICAL FIELD

This invention relates to the food industry, particularly, to preparing semi-finished products in a package, with the possibility of their further automated heating and/or cooking before delivery to a consumer.

BACKGROUND

A known method of preserving ready-to-eat and/or ready-to-cook foods in a package made of multilayer barrier films adaptable to further heating include purifying, cutting, cooking and placing ready-to-eat and/or ready-to-cook foods into a package made of multilayer barrier films, and sealing and autoclave sterilizing, with the sterilization being performed in a water spray autoclave using a steam and air mixture (RU 2680585 C1, 22.02.2019).

Another known method involves cooking first-course meals, more specifically sautéed soups at public catering business, the method including preliminary estimation of foodstuffs and number of sautéed soup serving portions prepared monthly by a particular business, calculation of raw staff content for recipe-based cooking, preliminary raw stuff treatment, more specifically washing, calibrating, purifying, cutting vegetables into pieces, browning them with fats, adding mashed tomatoes, if applicable to such a recipe dish, and/or washing cereals, beans, wherein ingredients of a dish are individually cooked with hot steam until ready for use, after which they are placed in a separate sealed container and loaded to a low-temperature chamber, where they are cooled down to 15-20° C. and then final freezing takes place at −18° C. for 6-9 hours, based on the container volume and the ingredient cutting method; then the required amount of each ingredient is weighed to gather one serving portion of a finished dish and each portion is put in a sealed package composed of frozen ingredients with salt, spices and vegetables added in accordance with the recipe, the semi-finished product package is vacuum sealed and stored at −18° C. for no more than 30 days; the semi-finished product is discharged into tableware for serving to a visitor, filled with hot water, bone broth, meat and bone broth, fish broth or with mushroom broth and heated in a microwave oven for 3-4 minutes; and a ready-to-eat high-quality first-course meal is produced (RU 2496388 C1, 27.10.2013).

Another known method involves production of ready-to-eat shelf-stable soybean-based first-course meals, the method providing for preliminary cooking of vegetable and/or cereal ingredients, and hydration of soybean textured proteins to gain a 30-45% humidity, compounding heat treatment, cooling, sorting, freezing at (−20)-(−40° C.) for 20-25 minutes, packaging, and storing (RU 2169499 C1, 27.06.2001).

The technical decision closest to the present invention is a pre-cooked food manufacturing system, according to which foodstuffs are preliminary cooked, which comprises of the following successive steps:

a) food cooking
b) food portioning with each portion or several portions packed in an appropriate package;
c) creating a partial vacuum in a package, which is sufficient, not only to prevent moisture evaporation from the package, but also to substantially remove oxygen from the package;
d) heat treatment of a package for its pasteurization and sterilization;
e) ultra-rapid freezing/shock freezing of a package;

wherein in step a) food cooking may proceed in a different way including, for example, steaming, roasting, frying or boiling, cooking under pressure or at partial vacuum, using a convection, microwave or other oven; as for step e) of an ultra-rapid/shock freezing, it is preferable to apply a cryogenic freezing technique using liquid nitrogen or liquid carbon dioxide, while in the latter case the temperature is to be brought down to −18° C., but it is better to bring it down to −23° C. and below. One of the embodiments additionally involves step f) which discloses a shock freezing procedure following the step of food cooking, and preceding the food portioning and packaging step; this step is specifically applied in the events when an amount of liquid, soft foods, or other compression-sensitive foods are available, thereby making it possible to increase density and to improve stability when handling; in step f) freezing takes place providing for portioning and vacuum packaging, preferably at 3° C. In step b) food portioning accordingly entails splitting foodstuffs into portions preferably while maintaining the temperature within a 0° C. to 5° C. range, provided that the foodstuffs have been cooled down in step f), wherein a portion is interpreted as an amount of foods intended for consumption by one person at one time, or consisting of no more than 700 g, preferably no more than a 500 g portion and, even more preferably, about a 200-300 portion. Each portion may consist of a single product or ingredient, or multiple ingredients in the form of a recipe or a ready-to-eat meal. A sealed tray, bag or jar, or any other container may be used as a package, provided that it is applicable to vacuuming as a result of using suitable materials, shapes, and configurations, thereby ensuring effective package sealing and vacuuming capacity. In step c) a partially vacuum sealed package needs at least 95% vacuum (maximum about 5 kPa) and preferably at least 97% vacuum (maximum about 5 kPa). In step d) it is preferable to pasteurize the package at a suitable low-temperature environment throughout a long-term food pasteurization procedure, for example, at about 85° C. for 6 minutes, rather than 110° C. for 3 minutes. Additionally, thanks to the described steps, dishes can be stored for a prolonged period up to a year and longer with a dish/food refreshed to achieve a ready-to-eat condition in several minutes using conventional equipment-a microwave or baking oven, oven bags, steam cooker, or using another suitable heating technique; besides such foods can retain exclusively high organoleptic and coloration properties closely resembling those of fresh foods (WO 2010091856 A2, 19.08.2010).

The technical solution described in the closest analog, in addition to evident advantages, exhibits a number of deficiencies. One of the main deficiencies is that said system does not take into account methods and programs of defrosting the food product (dish) prior to serving it to a consumer. As is known, physical, chemical and organoleptic properties of food products significantly change as a result of thermal exposure and, accordingly, the whole dish defrosted and heated may have properties significantly different from those exhibited by the food if it had been freshly made. In the above analog, it is proposed to warm up frozen dishes in any known way using a microwave oven, bake oven or steam cooker. But this very dish defrosting and heating method and the regimen applied greatly affect end-use properties exhibited by a dish prior to serving to a consumer. When being exposed to inefficient heat, a dish may remain cold containing some unfrozen areas, but when being exposed to excess heat, a dish may overheat and lose an amount of its end-use properties. Some moisture will escape, denaturation of protein compounds will take place, and vegetable fibers will change their structure, losing vitamins and trace substances. Additionally, the closest analog does not describe any techniques applicable for setting regimen (power and heat exposure time) with foods defrosted and/or heated using various types of equipment. Another deficiency in the above analog is that a portioning step b) specifies only a portion weight while keeping out of any method or parameters applicable for placing the dish in a package container, and this, in turn, may significantly affect the duration of a defrosting and/or heating period and/or duration of a cooking period and input power.

SUMMARY

It is an object of the present invention to remove said deficiencies and to establish a method of preparing semi-finished products in a package adaptable to further automated heating and/or cooking (prior to serving to a customer), providing optimal tastes of semi-finished products, regardless of personnel defrosting and heating and/or cooking experience.

The technical result of this invention is aimed at providing balanced defrosting, heating and/or cooking techniques applicable to all components of the semi-finished product without the loss of ready-to-eat meal end-use properties, while specifically preserving moisture and vegetable fiber structure, as well as vitamins and trace substances of the semi-finished product.

The presented technical result is achieved through the use of the method of cooking of semi-finished products in a package adaptable to further automated heating and/or cooking, according to which the following procedure is carried out: semi-finished products are preliminary cooked; they are rapidly cooled down to 5-9° C. for no more than 90 minutes and placed in a food portion container. The size and shape of the components of the semi-finished products placed in the container are selected so that microwave radiation fully penetrates through all of the components. Then, the container with a semi-finished product is hermetically sealed with air being substituted for by carbon dioxide or helium, and then the container with the semi-finished product is treated with ultraviolet radiation having a specific radiant energy of not less than 1600 J/m.$^2$ A barcode encoding a microwave oven heating and/or cooking program is applied to the container with the semi-finished product. The program contains an indication of the power level of the microwave radiation source, which is sufficient for balanced and complete heating and/or cooking of all components the semi-finished product is composed of, and time required for its complete heating and/or cooking, after which shock freezing of the semi-finished product takes place, wherein a working chamber temperature is −30 to −40° C. and cold flow rate is 4-6 m/s; and the product is stored and/or transported at a temperature not higher than −18° C. Before eating, the semi-finished products are automatically heated and/or finally cooked in a microwave oven equipped with a barcode reader.

Thus, said technical result is achieved by:
a different degree to which each component of a semi-finished product is cooked giving consideration to further automated defrosting, heating and/or cooking of the semi-finished product prior to serving to a consumer;
charging of a food portion container with components of a semi-finished product that have a specific shape and weight and that are placed in a specific way giving consideration to further automated defrosting, heating and/or cooking;
shock freezing of each semi-finished product according to an individual program for gaining maximum preservation of the original structure of the components of each semi-finished product, and reduction of energy used for feeding shock freezing;
automated defrosting and heating and/or cooking of a semi-finished product in the microwave oven equipped with a barcode reader according to an individual program encoded in a barcode applied to a food container.

BRIEF DESCRIPTION OF THE DRAWINGS

The present invention is described with reference to the drawings.

FIG. 1 illustrates a diagram of a technological scheme flow chart of an exemplary method.

DETAILED DESCRIPTION

A method 100 for preparing semi-finished products in a package with the possibility of their further automated heating and/or cooking is implemented as follows.

In stage 1, components of a semi-finished product are cooked in any form known in this industry including, for example, steaming, roasting, frying, or boiling, cooking under pressure or at partial vacuum, using a convection or microwave oven, steam oven, etc., till the required degree to which a product is cooked according to a recipe (step 101). Each component has its own degree to which it is cooked. For example, when cooking pasta with seafood, spaghetti boils in water for 8-9 minutes to gain an 'al dente ultra' texture. Seafood is baked in a steam oven. Baked squid is cooked with convection at 300° C. for 4 minutes, baked mussels are cooked with convection at 300° C. for 2 minutes. When cooking meatballs with rice, the rice boils in the rice steamer for 20 minutes until an 'al dente' texture is gained; baked meatballs are cooked in the steam oven at t=180° C. for 12 minutes. Thus, in stage 1, the above pasta and rice dish components, which rapidly change their properties when heated, remain somewhat incompletely cooked (boiled) for retaining optimal organoleptic properties to be exploited when exposed to additional heat treatment during further defrosting and heating processes.

In stage 2, accelerated cooling of the components of a semi-finished product cooked at stage 1 is performed with the temperature being dropped to from 5 to 9° C. in order to prevent propagation of pathogenic microorganisms, as well as to make it more convenient to place dishes in food portion containers at the next stage (step 102). In this stage, the cooked food temperature is reduced from 70-80° C. to 5-9° C. for a period of no more than 90 minutes.

In stage 3, components of the semi-finished product are placed (portioned) in a food portion container according to the process chart, with all components having a specific shape and weight (step 103). For example, when cooking udon-noodle with chicken and vegetables, a Hallde processor is used for cutting vegetables into 2×2 cm strips. Garnish and porridge weight is gathered in such a way so as to obtain a balanced 2÷2.5 cm layer with the garnish placed in a standard food portion container. This is required to obtain the penetration depth of the microwave radiation into the food when defrosting and heating in a microwave oven. For example, when cooking: 0.9 cm potatoes, 1.4 cm boiled beef, 1.1 cm carrot, and 1.2 cm beet are required [1]. Consequently, dish components are selected by size in such a way that microwave radiation can fully penetrate through the foods. This makes it possible to execute the process of defrosting and heating as quickly as possible, which, in its turn, provides dish properties to be close to those of freshly prepared food in quality.

In stage 4, a food portion container with a semi-finished product is sealed, for example, with a polyethylene film (step 104). Additionally, residual air is pumped out of the free space in the container and substituted with gas, for example, carbon dioxide or helium. Carbon dioxide inhibits propagation of microorganisms, thereby contributing to the creation of a preservative effect during a product storage period. In addition, it exhibits proper solubility in fats and in high-fat products, where it exists in its free state, but it is easily released when a product is relocated to any typical environment. Carbon dioxide, being dissolved in fat, displaces oxygen, thereby inhibiting oxidation of fat during long-term storage [2]. As for helium, it has a higher (six times) thermal conductivity compared to air, thereby contributing to heat removal from a product during freezing and further storage. Helium gas protects products from oxidation and inhibits pathogenic bacteria activity. Helium does not adversely affect color, flavor, or break down vitamins; it completely preserves product biological value.

In stage 5, a sealed container with a semi-finished product is irradiated using ultraviolet germicidal lamps (step 105). This provides a decontamination with ultraviolet radiation—i.e., killing microorganisms to a safe level within the gas medium inside the container and on the surfaces of the products and on the surfaces of the container. In this case, specific irradiation energy should be at least 1600 J/m$^2$ [3]. Permeability of ultraviolet radiation through an interior space of a container is provided by the transparency of a polyethylene film or other ultraviolet irradiation-permeable material the container is sealed with.

In stage 6, a barcode is applied to a food portion container with a semi-finished product, and this barcode encodes a program for defrosting, heating and/or cooking in a microwave oven is encoded to set specific power output levels of microwave radiation and time intervals for defrosting a semi-finished product and for bringing it to its ready-to-eat condition (step 106).

In stage 7, shock freezing of the semi-finished product is performed according to an individual program developed for each type of semi-finished product (step 107). The program regulates the freezing rate under various temperature ranges and minimizes the changes in the structure of the components included in the semi-finished product. This is achieved when small ice crystals are evenly distributed within the tissue and almost simultaneously within a cell and intercellular walls (cells remain intact) as a result of rapid freezing of foods, which, in turn, makes it possible to prevent damage to the food tissue structure caused by large ice crystals and to retain its original properties.

Additionally, the object of stage 7 (step 107) is to provide phase transition of the liquid contained in the semi-finished product into its solid state in terms of its transition period and energy use. This transition occurs at a 0° C. to −5° C. temperature range, having a significant effect on product heat removal performance, but the product temperature is maintained at a constant level since the heat release process is followed by phase transition of a major portion of water (about 70%) into ice. An optimal recommended shock-freezing regimen is provided by an air freezing method when the temperature in the working chamber is from −30° C. to −40° C. and cold air flow is 4-6 m/s. This regimen makes it possible to provide a forced transition from a liquid phase to a solid phase. Further decrease in the temperature results in undue energy use and increased product deformation. The temperature at a start point of the phase transition is different for various products since it primarily depends on concentration of available dissolved substances other than on water content in a product. For example, the temperature of −2 to −3° C. corresponds to an initial freezing point of high humidity level vegetables and the temperature of about −1° C. corresponds to that of lean meat [4].

The effect of maintaining the quality of frozen semi-finished products is achieved, provided that a major portion of free water (more than 80%) contained in the products turns into ice and such state remains unchanged during further storage. The intensive freezing of moisture ends within a −15 to −20° C. range and, therefore, an accelerated freezing phase is terminated and proceeds to the next phase after such temperatures (preferably −18° C.) are reached. A combination of the above factors determines individual freezing programs for each semi-finished product type. These programs are determined experimentally—i.e., through freezing a reference dish and measuring the temperature inside the dish and the time within which this temperature is reached. For example, garnish potatoes are frozen inside quick-freezing machines at temperatures of from −34 to −40° C. for 6-12 minutes until a temperature of −15° C. gained in the center of the product. Further, the temperature covering the entire mass is balanced and the product may be stored at −18° C. [2].

In stage 8, frozen semi-finished products are stored and transported at a temperature no higher than −18° C. (step 108).

In stage 9, automated defrosting, heating and/or cooking of a semi-finished product are performed in a microwave oven equipped with a barcode reader (step 109). For this, it is needed to bring a food container with a barcode to the barcode reader of the microwave oven and, after the code read successfully, it is needed to place the food container with the semi-finished product into the microwave oven, after which a heating and/or cooking process will start. The microwave oven will generate light and sound signals upon the termination of the semi-finished product defrosting and heating program. Then, the semi-finished product is ready to eat.

The barcode applied to a package with a semi-finished product contains a program that is appropriate for defrosting and heating the dish. Each component of the dish has its own dielectric permittivity, which has an effect on the depth of penetration of an alternating electromagnetic field into food products, and, accordingly, has an effect on the rate of heating of the dish components. For example, at 2450 MHz, the penetration depth for boiled beef is 1.4 cm and for boiled potatoes is 0.9 cm [1]. Such different values involve different heating rates at specific microwave radiation source power. It is important that, when defrosting and heating a semi-finished product in a microwave oven, each of the components has its optimal ready-to-eat condition upon termination of the program.

Since the defrosting and heating program is the same for the entire semi-finished product containing different components, the difference of component properties is compensated for at stages 1 and 3, where the degree to which they are cooked, their size and their placement in the food portion container are accounted for. Additionally, food product dielectric permittivity depends on the product temperature, which has an effect on the heating rate within an alternating electromagnetic field. For example, with the temperature of the food product changed from −20° C. to −5° C., an increase in the heating rate by 4-5 times is observed [1]. The defrosting and heating process is split into two phases in order to have a semi-finished product defrosted steadily and smoothly. At the first −18° C.-(−20)° C. to the −5° C.-(−7° C.) phase, defrosting is provided at a reduced power of the microwave radiation source, e.g., about 30-40% of the rated power.

Upon termination of the first phase, the defrosting and heating process runs at 80-100% of the rated power. The time intervals of each stage are selected so that all components of the semi-finished product have an optimal temperature by the end of the microwave oven program, and achieve a fully ready-to-eat condition. Those dish components that did not reach the ready-to-eat condition at the first stage (for example, rice or pasta) acquire the properties of the ready-to-eat components having received additional thermal energy during defrosting and heating, while other components, for example meat products, are simply brought to the use temperature. This is the very kind of cooking of the semi-finished product being performed in the microwave oven.

For example, while running the program for cooking pasta with seafood, the first defrosting phase is carried out at 40% of the rated power for 280 seconds; the second heating phase is carried out at 90% of the rated power for 80 seconds. The proposed method makes it possible to provide a diverse menu to ensure high consumer-target quality of served dishes, and to organize meals for the general population, or employees of enterprises, without the need to create a fully-fledged kitchen with qualified personnel, and with minimal loss of products during storage.

EXAMPLE

Exemplary pasta and seafood preparation process.
1) Preparation:
   Seafood (mussel feed, shrimp, squid) is thawed at a temperature of from 2-4° C. Further, the thawed seafood is cleaned. The squid is cut into 0.5 cm rings and the shrimp is cut in half lengthwise.
   Tomatoes are washed and shallow notches are made in the form of a cross and the tomatoes are blanched in hot water for 15-20 seconds. The skin is peeled off and the fruit stem is removed. Then, the tomatoes are cut in a food processor into a large 2×2 cm cubes to be transferred to the hot shop.
   Garlic is cleaned and transferred to the hot shop.
2) Cooking
   Cleaned seafood is seasoned with vegetable oil, salt, and pepper, thoroughly mixed, spread out on 1/1-10 commercial pans with a uniform layer and baked in a steam oven:
   Shrimp T=300° C., with convection for 4 minutes.
   Squid T=300° C., with convection for 4 minutes.
   Mussels T=300° C., with convection for 4 minutes.
   The cooked seafood is transferred to perforated commercial pans, and cooled in a shock cooling apparatus to a temperature of 5-9° C., after which it is transferred to the packing shop.

Exemplary Non-Dairy Cream Preparation Process:
   Butter is melted in a frying pan or in a pot. Sifted flour is added to the melted butter, and fried continuously stirring with a whisk until light brown in color. 50% by weight cold milk is added into the fried flour and thoroughly mixed until the flour is completely dissolved, then brought to a boil.
   The mass-produced product is transferred to a container and the remaining ingredients are added, whipped with an immersion blender until a homogenous mass is formed, and the finished sauce is filtered through a sieve. The product is then transferred to the packing shop.

Exemplary Pasta Dressing Preparation Process:
   Butter is melted in a frying pan or in a pot. Sifted wheat flour is added to the melted butter, and fried until light brown while continuously stirring with a whisk. Further, cold milk and cold water are combined and poured into the fried flour, while mixing thoroughly with a whisk until a homogenous mass is obtained. The product is then transferred to the packing shop.

Exemplary Tomato-Basil Sauce Preparation Process:
   Garlic is fried in a pot with heated vegetable oil until golden brown. Tomatoes are transferred to a commercial pan and whipped with an immersion blender until homogenous and then added to the fried garlic, brought to a boil, put on "medium" heat and simmered for 20 minutes. Sliced tomatoes are added to passioned tomatoes, thoroughly mixed, put on a high heat and brought to a boil. Next, a pasta dressing is added and the pan is removed from the heat. Coarsely chopped basil leaves are added into the cooled sauce. The product is transferred to the packing shop.

Exemplary spaghetti preparation process:
   Water is poured into a pot and salt is added. The pot is put on the cooking oven and brought to a boil; spaghetti is added while stirring to avoid sticking. Cooking is for 8-9 minutes until it the spaghetti achieves an 'al dente ultra' texture.
   Cooked spaghetti is placed into a perforated 1/1-400 commercial pan and quickly cooled with water down to room temperature, seasoned with vegetable oil, thoroughly mixed, and transferred to the packing shop.
   Parsley is washed and finely chopped.

Packing:
   Container "100" is used for packing the dish;
   Spaghetti is placed into the container and spread evenly over the entire area of the container—115 g.
   The spaghetti in the container is then covered with the tomato-basil sauce—55 g and non-dairy cream—35 g.

Seafood is Placed in the Following Order:
   1.—squid—with a uniform layer over the entire surface—25 g.
   2.—shrimp—with a uniform layer over the entire surface—15 g.
   3.—mussel meat—with a uniform layer over the entire surface—15 g.
   The dish is sprinkled with chopped parsley.
   The container with the cooked dish is sealed with a plastic film, and air is pumped out of the container with the dish and carbon dioxide or helium is injected. A label with all of the necessary information is applied onto the film and transferred to the shock freezing workshop, where the container with the dish is irradiated with bactericidal lamps and freezing according to an appropriate program to a temperature of from −18° C. to −20° C. The container is stored at T=−18° C. for 180 days.

BIBLIOGRAPHY

1. Rogv I. A., Nekrutman S. V. Product microwave heating.-M.: Agropromizdat, 1986. 351 p.
2. Bolshakov S. A. B 799 Refrigerating machines and food process technology: Textbook for high-school students/ Sergey Alexeyevich Bolshakov.-M.: Publishing Center "Academy", 2003. 304 p.
3. Recommendations on the use of sources of ultraviolet bactericidal radiation for production, storage and transportation of semi-finished and food products of animal and vegetable origin.-M.: FGBNU "Rosinformagro-Tech", 2019. 52 p.
4. MOODLE KNITU (KHTI) Kazan National Research Technological University, Distant Learning, Subject 1. Lecture 3 (https://moodle.kstu.ru/pluginfile.php/336126/mod_resource/content/1/Tema%202%2B.pdf).
5. Basics of refrigerating machines and refrigerating technology: [for universities, Major No. 1011 «Catering technology and organization]/F. E. Meshcherikov.—Moscow: Food industry, 1975. 560 p.

The invention claimed is:

1. A method of cooking of a pre-cooked product in a package adaptable to further automated heating and/or cooking, the method comprising:
   cooking a product to obtain a pre-cooked product;
   rapidly cooling the pre-cooked product down to a temperature from 5° C. to 9° C. for no more than 90 minutes to obtain a cooled pre-cooked product;
   placing the cooled pre-cooked product into a food portioning container, wherein a size and shape of components of the cooled pre-cooked product placed into the food portioning container are selected to permit microwave radiation to fully penetrate through the components;
   packaging the food portioning container containing the cooled pre-cooked product into a hermetically sealed package, wherein air in the package is replaced with carbon dioxide or helium;
   treating the package containing the food portioning container with ultraviolet radiation having a specific radiant energy of not less than 1600 J/m$^2$;
   applying a barcode to the package containing the food portioning container, the barcode encoding an individual microwave oven heating program determined specifically for the pre-cooked product, the microwave oven heating program containing an indication of a power level of the microwave oven required and a time required to heat the pre-cooked product to a consumption-ready condition;
   shock freezing the package containing the barcode and the pre-cooked product according to an individual shock freezing program experimentally determined specifically for a type of the pre-cooked product;
   after the shock freezing, storing or transporting the package containing the barcode and the pre-cooked product at a temperature not higher than −18° C.; and
   prior to consumption, and in response to a barcode reader of a microwave oven reading the barcode on the package containing the pre-cooked product, causing the microwave oven to heat the pre-cooked product to the consumption-ready condition according to the individual microwave oven heating program encoded on the barcode;
   wherein the cooking of the product to obtain the pre-cooked product further comprises cooking ingredients of the product separately according to an individual heating program specific to each of the ingredients, wherein each individual heating program is selected to cook each of the ingredients to a different degree accounting for expected changes to each of the ingredients in response to the shock freezing of the pre-cooked product and heating of the pre-cooked product in the microwave according to the individual microwave oven heating program.

2. A method of cooking of a pre-cooked product in a package adaptable to further automated heating and/or cooking, the method comprising:
   applying a barcode to the package containing the food portioning container, the barcode encoding an individual microwave oven heating program determined specifically for the pre-cooked product, the microwave oven heating program containing an indication of a power level of the microwave oven required and a time required to heat the pre-cooked product to a consumption-ready condition;
   shock freezing the package containing the barcode and the pre-cooked product according to an individual shock freezing program experimentally determined specifically for a type of the pre-cooked product;
   after the shock freezing, storing or transporting the package containing the barcode and the pre-cooked product at a temperature not higher than −18° C.; and
   prior to consumption, and in response to a barcode reader of a microwave oven reading the barcode on the package containing the pre-cooked product, causing the microwave oven to heat the pre-cooked product to the consumption-ready condition according to the individual microwave oven heating program encoded on the barcode.

3. A method of cooking of a pre-cooked product in a package adaptable to further automated heating and/or cooking, the method comprising:
   applying a barcode to the package containing the food portioning container, the barcode encoding an individual microwave oven heating program determined specifically for the pre-cooked product, the microwave oven heating program containing an indication of a power level of the microwave oven required and a time required to heat the pre-cooked product to a consumption-ready condition;
   shock freezing the package containing the barcode and the pre-cooked product according to an individual shock freezing program experimentally determined specifically for a type of the pre-cooked product; and
   prior to consumption, and in response to a barcode reader of a microwave oven reading the barcode on the package containing the pre-cooked product, causing the microwave oven to heat the pre-cooked product to the consumption-ready condition according to the individual microwave oven heating program encoded on the barcode.

4. The method of claim 1, wherein the individual shock freezing program pre-determined experimentally for the type of the pre-cooked product specifies that the shock freezing of the pre-cooked product requires a temperature of from −30° C. to −40° C. and at a cold air flow rate of from 4 m/s to 6 m/s.

5. The method of claim 2, wherein the individual shock freezing program pre-determined experimentally for the type of the pre-cooked product specifies that the shock freezing of the pre-cooked product requires a temperature of from −30° C. to −40° C. and at a cold air flow rate of from 4 m/s to 6 m/s.

6. The method of claim 3, wherein the individual shock freezing program pre-determined experimentally for the type of the pre-cooked product specifies that the shock freezing of the pre-cooked product requires a temperature of from −30° C. to −40° C. and at a cold air flow rate of from 4 m/s to 6 m/s.

\* \* \* \* \*